Feb. 6, 1945.  E. C. KRUEGER  2,368,848
BELT TIGHTENER
Filed Aug. 5, 1944
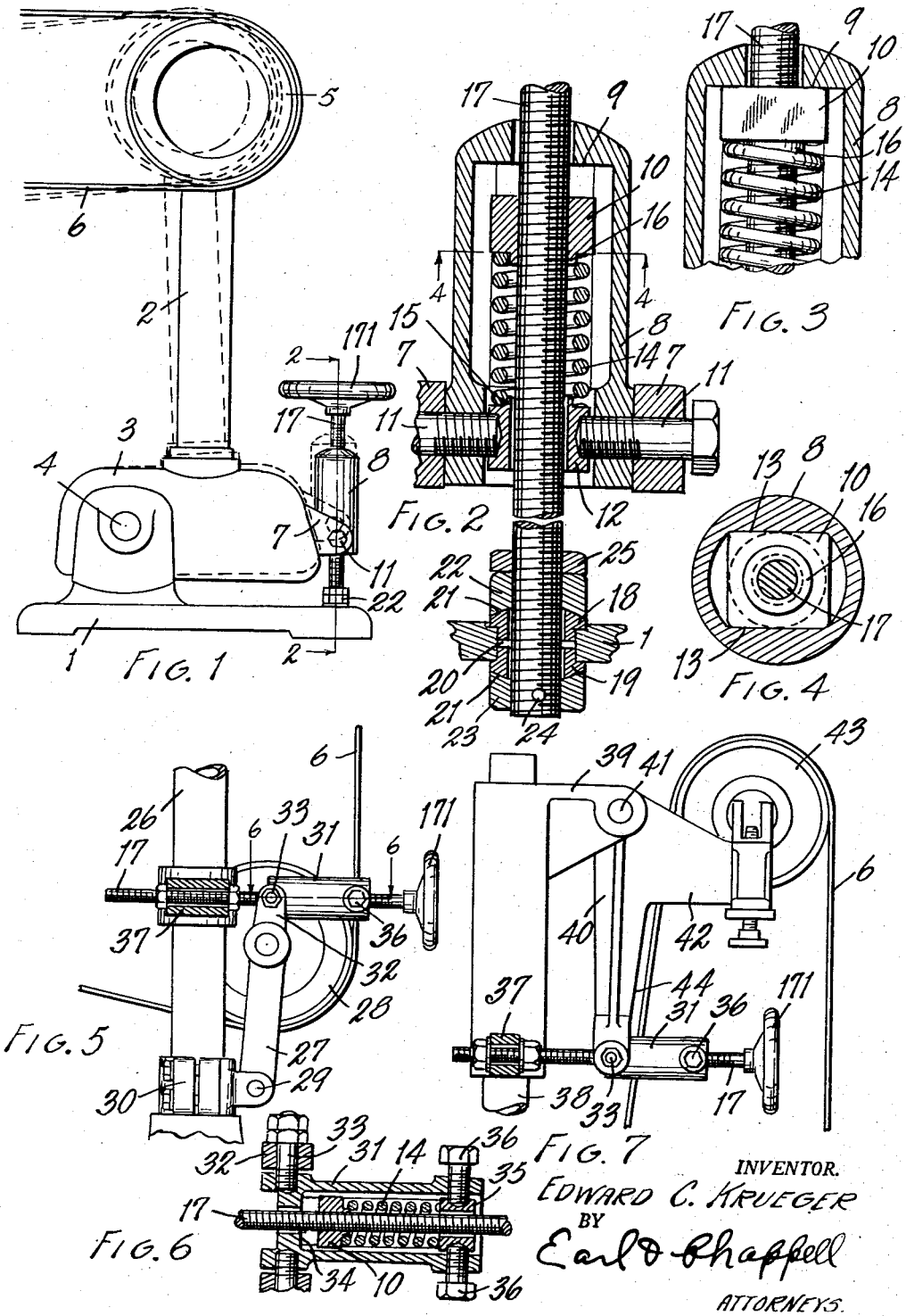
INVENTOR.
EDWARD C. KRUEGER
BY
Earl D. Chappell
ATTORNEYS.

Patented Feb. 6, 1945

2,368,848

UNITED STATES PATENT OFFICE 2,368,848

BELT TIGHTENER

Edward C. Krueger, Otsego, Mich., assignor to Hammond Machinery Builders, Inc., Kalamazoo, Mich.

Application August 5, 1944, Serial No. 548,156

4 Claims. (Cl. 51—148)

This invention relates to improvements in belt tighteners.

The main objects of this invention are:

First, to provide a belt tightener well adapted for tightening, polishing or grinding belts or belts in which a uniform belt tension may be attained with reasonable variations in the length of the belt such as result from structure, stretching or the like.

Second, to provide a belt tightener in which the pivotally mounted pulley support or carrier is effectively supported when the tightener is in fully retracted position for supporting the pulley to permit changing of belts and the like.

Third, to provide a structure having these advantages in which the belt tension may be very accurately adjusted through a wide range of adjustment and one in which only one adjusting member is required for the operations of slacking off the belt and supporting the belt pulley carrier in slacked off position.

Fourth, to provide a structure having a wide range of adjustment in which the spring tension works only through a relatively narrow or limited range of adjustment, thereby making the manual adjustment easy and one in which it is not necessary to work all the adjustment against the spring.

Objects pertaining to details and economies of the invention will appear from the description to follow. A structure which embodies the features of the invention is illustrated in the accompanying drawing, in which:

Fig. 1 is a side elevation of a structure embodying my invention, the slacked off or released position being shown by dotted lines, the structure illustrated being an adaptation of my invention to a grinding or polishing machine.

Fig. 2 is an enlarged fragmentary view partially in section on line 2—2 of Fig. 1.

Fig. 3 is a fragmentary view partially in section corresponding to Fig. 2 with the spring adjusting thrust member in its fully retracted position or at the limit of its spring releasing adjustment.

Fig. 4 is a cross section on line 4—4 of Fig. 2.

Fig. 5 is a fragmentary side elevation of a modified form or embodiment of my invention partially in section.

Fig. 6 is an enlarged fragmentary view in section on line 6—6 of Fig. 5 showing details of the structure there illustrated.

Fig. 7 is a fragmentary side elevation of another embodiment or adaptation of my invention with certain parts in section.

Referring to the embodiment of the invention as illustrated in Figs. 1 to 4 inclusive, 1 is a base on which the pedestal-like pulley carrier 2 is pivotally mounted, the carrier 2 having a foot piece 3 pivotally mounted at 4. The pulley is represented at 5 and the belt at 6. This structure illustrated is a backstand or pulley support for a polishing belt, the driving pulley for the belt not being illustrated. The footpiece 3 is provided with a pair of pivot ears 7 at its end opposite the pivot 4, the ears being spaced to receive the tubular shackle member 8 between them. The outer end of the shackle member constitutes an abutment 9 for the spring tension adjusting member 10.

The shackle member is mounted on the ears 7 by means of the pivots 11 which are threaded into the shackle member and supportingly engage the spring supporting member 12 (Fig. 2). The shackle member is of non-circular internal section having opposed flat sides 13 so that the member 10 is supported for sliding non-rotatable adjustment. The coiled spring 14 is arranged between the members 12 and 10 which are provided with flanges 15 and 16 respectively, receiving the end coils of the spring and holding it against tilting or cocking when subjected to compression.

The adjustment rod 17 is mounted for swiveled and rocking adjustment in the base 1 by means of the opposed bearing members 18 and 19 shouldered to engage within the hole 20 in the top of the base 1 and having convex bearing surfaces 21. The rod is provided with bearing member 22 and 23 which are concavely faced to coact with the bearing members 18 and 19. The rod is pinned at 24 to the bearing member 23, the bearing member 22 being adjustably secured by means of the nut 25. With this arrangement the pulley carrier may be very quickly adjusted to properly tension the belt and retracted to bring the adjusting member 10 into engagement with the abutment 9 by the turning of hand wheel 171.

The spring is arranged between the members 10 and 12 under tension and has sufficient tension and strength to effectively support the pulley carrier when the spring is at the limit of its releasing or tension relaxing adjustment as shown in Fig. 3. This provides an effective tensioning of the belt at all positions of adjustment and an effective support permitting the replacement of the belt.

In the embodiment of the invention shown in Fig. 5 the support member 26 is in the form of an upright or pedestal, the carrier 27 for the pulley 28 being pivotally mounted at 29 on the bracket 30 which is clamped upon the support. The shackle member 31 is secured to the forks 32 of the upper end of the pulley carrier 27 by means of the pivots 33 which are threaded into the shackle as shown in Fig. 5. The abutment 34 of this embodiment is at the pivoted end of the shackle. The spring supporting thrust member 35 is secured within the shackle member by means of screws 36. The adjusting rod 17 is arranged through a sleeve-like bracket 37 on the support 26. Otherwise the structure is substantially the same as the preferred embodiment decribed.

In the embodiment shown in Fig. 7 the support 38 is in the form of an upright having the bracket 39 sleeved and secured thereon. The pulley carrier 40 is pivoted at 41 on this supporting bracket, the carrier having an arm 42 carrying the pulley 43 and a depending arm 44 to which the shackle member 31 is secured, the parts being otherwise substantially as in the embodiments shown in Figs. 5 and 6.

I have illustrated my invention in embodiments which I have found highly practical. I have not attempted to illustrate or describe other embodiments and adaptations which might be desirable as it is believed this disclosure will enable the practice of my invention as may be desired.

Having thus described my invention what I claim as new and desire to secure by Letters Patent is:

1. In a belt tightener, the combination with a base, of a belt pulley carrier provided with a front piece pivotally mounted at one end on said base and having pivot ears remote from its pivotal mounting, a tubular shackle member having an abutment at its outer end and of non-circular internal section disposed with its inner end between said pivot ears, a spring supporting member arranged within said shackle member, pivots for said shackle member carried by said ears and threaded into said shackle member to supportingly engage said spring supporting member, a spring arranged within said shackle member in supported engagement with said spring supporting member, a threaded adjusting rod arranged longitudinally through said shackle member and spring and said spring supporting member and having swiveled and tilting supporting connection with said base, and an adjusting thrust member for said spring having threaded engagement with said adjusting rod and sliding engagement with the non-circular interior of said shackle member, the abutment of said shackle member constituting a stop limiting the outward adjustment of said spring thrust member, said spring being under spring tension when said spring adjusting member is in engagement with the outer end of said shackle member whereby the pedestal is supported when the spring adjusting member is at the limit of its spring relaxing adjustment.

2. In a belt tightener, the combination with a base, of a belt pulley carrier provided with a front piece pivotally mounted at one end on said base and having pivot ears remote from its pivotal mounting, a shackle member, a spring supporting member arranged within said shackle member, pivots for said shackle member carried by said ears and threaded into said shackle member to supportingly engage said spring supporting member, a spring arranged within said shackle member in supported engagement with said spring supporting member, a threaded adjusting rod arranged longitudinally through said shackle member and spring and said spring supporting member and having swiveled connection with said base, and an adjusting thrust member for said spring having threaded engagement with said adjusting rod and sliding non-rotating engagement with said shackle member, said spring being under spring tension when said spring adjusting member is at its outer limit of adjustment whereby the pedestal is supported when the spring adjusting member is at the limit of its spring relaxing adjustment.

3. In a belt tightener, the combination with a support, of a belt pulley carrier pivotally mounted on said support for swinging adjustment, a tubular shackle member having an abutment at one end and of non-circular internal section pivotally connected to said pulley carrier, a spring supporting member arranged within said shackle member, a spring arranged within said shackle member in supporting engagement with said spring supporting member, an adjusting rod arranged longitudinally through said shackle member and spring and said spring supporting member and rotatably connected with said support, and a spring tensioning thrust member for said spring having threaded engagement with said adjusting rod and sliding engagement with the non-circular interior of said shackle member, said abutment of said shackle member constituting a stop limiting the spring relaxing adjustment of said spring thrust member, said spring being under such tension as to support said pulley carrier when the spring adjusting member is in engagement with said abutment whereby the pedestal is supported when the spring adjusting member is at the limit of its spring relaxing adjustment.

4. In a belt tightener, the combination with a support, of a belt pulley carrier pivotally mounted on said support for swinging adjustment, a shackle member having an abutment pivotally connected to said pulley carrier, a spring supporting member on said shackle member, a spring arranged in supported engagement with said spring supporting member, an adjusting rod arranged longitudinally through said spring and said spring supporting member and rotatably connected with said support, and a spring tensioning thrust member for said spring having threaded engagement with said adjusting rod and sliding non-rotatable engagement with said shackle member, said abutment of said shackle member constituting a stop limiting the spring relaxing adjustment of said spring thrust member, said spring being under such tension as to support said pulley carrier when the spring adjusting member is in engagement with said abutment whereby the pedestal is supported when the spring adjusting member is at the limit of its spring relaxing adjustment.

EDWARD C. KRUEGER.